(12) United States Patent
Birklykke et al.

(10) Patent No.: US 12,438,689 B2
(45) Date of Patent: Oct. 7, 2025

(54) METHOD FOR RADIO COMMUNICATION OF UTILITY METERS WITH A DATA RECEIVER

(71) Applicant: Kamstrup A/S, Skanderborg (DK)

(72) Inventors: Alex Birklykke, Skanderborg (DK); Jesper Torsvik Toft, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 0 days.

(21) Appl. No.: 18/680,218

(22) Filed: May 31, 2024

(65) Prior Publication Data

US 2024/0413964 A1 Dec. 12, 2024

(30) Foreign Application Priority Data

Jun. 8, 2023 (EP) ..................................... 23178190

(51) Int. Cl.
*H04L 7/00* (2006.01)
*H04Q 9/00* (2006.01)

(52) U.S. Cl.
CPC ............ *H04L 7/0016* (2013.01); *H04Q 9/00* (2013.01); *H04Q 2209/60* (2013.01)

(58) Field of Classification Search
CPC .... H04L 7/0016; H04Q 9/00; H04Q 2209/60; G01D 4/004
See application file for complete search history.

(56) References Cited

U.S. PATENT DOCUMENTS

| | | | | |
|---|---|---|---|---|
| 5,053,983 A | * | 10/1991 | Hyatt | ...................... G10L 19/00 708/321 |
| 5,410,621 A | * | 4/1995 | Hyatt | ................... G05B 19/408 382/263 |
| 5,430,759 A | * | 7/1995 | Yokev | .................. H04B 1/7156 375/E1.033 |
| 6,181,258 B1 | * | 1/2001 | Summers | ............... H03D 7/163 340/870.18 |
| 6,456,671 B1 | | 9/2002 | Patire | |
| 6,477,558 B1 | * | 11/2002 | Irving | ................... G06F 9/4887 718/100 |
| 6,654,432 B1 | | 11/2003 | O'Shea et al. | |

(Continued)

*Primary Examiner* — Amine Benlagsir
(74) *Attorney, Agent, or Firm* — McGlew and Tuttle, P.C.

(57) ABSTRACT

A radio communication method involves utility meters installed at distributed installation locations with a data receiver. Data is received from the utility meters. Data is modulated on a received signal having a time-varying phase offset. Decision-directed phase tracking compensates for the time-varying phase offset. The compensated received signal is coherently demodulated to extract data. Extracted data is modulated to reconstruct a replica of the received signal. A phase offset prediction error—comparison between compensated received signal and the replica—and a phase offset prediction error covariance-divergence of compensated received signal and reference value and/or of phase offset prediction error and error reference value—are estimated and input into a Kalman filter. A Kalman filter output provides a prediction of time-varying phase offset in a feedback loop to compensate time-varying phase offset of received signal before compensated received signal is coherently demodulated to extract data.

15 Claims, 6 Drawing Sheets

(56) References Cited

U.S. PATENT DOCUMENTS

| | | | |
|---|---|---|---|
| 6,677,862 B1* | 1/2004 | Houlihane | H04B 1/0025 |
| | | | 375/295 |
| 2004/0131125 A1* | 7/2004 | Sanderford, Jr. | H04L 25/4902 |
| | | | 375/261 |
| 2008/0069118 A1* | 3/2008 | Monier | H04B 1/7143 |
| | | | 370/400 |
| 2013/0201316 A1* | 8/2013 | Binder | H04L 67/12 |
| | | | 701/2 |
| 2015/0280841 A1 | 10/2015 | Gudovskiy | |
| 2019/0324439 A1* | 10/2019 | Cella | G06N 3/042 |
| 2022/0107206 A1* | 4/2022 | Olson | G01F 15/063 |
| 2024/0195528 A1* | 6/2024 | Elshafie | H04L 1/1887 |
| 2024/0345214 A1* | 10/2024 | Duan | H04L 27/2605 |

* cited by examiner

METHOD FOR RADIO COMMUNICATION OF UTILITY METERS WITH A DATA RECEIVER

CROSS REFERENCE TO RELATED APPLICATIONS

This application claims the benefit of priority under 35 U.S.C. § 119 of European Application 23178190.7, filed Jun. 8, 2023, the entire contents of which are incorporated herein by reference.

TECHNICAL FIELD

The present disclosure relates to a method for radio communication of a plurality of utility meters being installed at distributed installation locations with a data receiver. Furthermore, the present disclosure relates to a data receiver configured to carry out such a method, a utility meter configured to be installed at an installation location and to wirelessly send data to such a data receiver, and an automatic reading system, ARS, comprising at least one such data receiver and a plurality of such utility meters.

BACKGROUND

It is known that utility providers of water, electricity, gas and/or thermal energy use automatic reading systems (ARS), e.g. automatic meter reading (AMR) systems or advanced meter infrastructure (AMI) systems, to efficiently and reliably manage customer billing. Such systems may be referred to as "dedicated" meter reading systems. Dedicated meter reading systems are characterized in that utility meters are installed in a plurality of distributed installation locations, e.g. households, and communicate consumption data to a head-end-system (HES) via a wireless communication with dedicated data collectors. A single data collector may collect the consumption data read by thousands of utility meters. Several data collectors may be distributed over a city or region to cover all utility meters located therein. Typically, the utility meters communicate with the data collectors wirelessly via a Low Power Wide Area Network (LPWAN) using license-free frequency bands in a manner that saves as much battery power of the utility meters as possible, because there is usually no opportunity for recharging or exchanging the utility meter battery. It is therefore a constant challenge to be able to guarantee a minimum battery lifetime, for example of at least 10, 15 or preferably even 20 years with hourly or daily readings.

In order to reduce the cost of implementing and maintaining an infrastructure of dedicated data collectors, a public cellular communications network may be used instead of dedicated data collectors to collect the consumption data. For instance, the utility meters may comprise a connection module, e.g. a modem, to connect to a LPWAN provided by a public cellular communications network, e.g. a Narrowband Internet-of-Things (NB-IoT) or Long-term Evolution Machine Type Communication (LTE-M) network, e.g. LTE Cat NB1, LTE Cat NB2, LTE Cat M1 or LTE Cat M2. The frequency bands used in such a LPWAN are licensed but have a large link budget.

In contrast to "dedicated" meter reading systems that "own" (includes lease) the data collector infrastructure, i.e. the LPWAN, a public cellular communications network is part of a "generic" meter reading system, in which the wireless communication infrastructure, i.e. the LPWAN, between the utility meter and the HES is owned, maintained and controlled by external parties, e.g. mobile network operators (MNO). Using a generic meter reading system, a utility provider (UP) of water, electricity, gas and/or thermal energy only owns (or leases), maintains and controls the utility meters and the HES.

Irrespective of whether the automatic reading system, ARS, and/or the LPWAN is dedicated or generic, any type of narrow-band radio communication typically occupies the medium for relatively long periods of time, which makes the narrow-band radio communication per se susceptible to in-band interference, particularly in congested radio environments of an ARS, more particularly in dedicated ARS using license-free ISM bands of an LPWAN. In generic non-dedicated ARS, interference may appear as so-called co-channel interference by an overlap of adjacent radio cells. In most cases, the interference is temporary in nature, which means that only a subsection of the received data is affected. However, the intermittent disruption of the reception represents a serious problem as it might cause a packet loss. This is, because a demodulator will produce errors with a high bit-error probability during the interfered subsections. As a result, a phase tracking mechanism may lose lock on the signal, which means that coherent demodulation of the remaining reception will no longer be possible. Unless the interference occurs late in the received data, the consequence will be a loss of the packet. Hence, the performance of narrow-band radio communication can be significantly improved by making it robust against intermitted interference.

Furthermore, battery-powered utility meters must usually wait for its crystal oscillator to warm up for the carrier frequency and phase shift to stabilize before sending data. Otherwise, a phase tracking mechanism at the data receiver may lose lock on the signal, which means that coherent demodulation of the remaining reception will no longer be possible. However, waiting for the warm-up period before sending data consumes energy of the battery-powered utility meter.

U.S. Pat. No. 6,456,671 B1 describes a method of phase-tracking for coherent signal detection. However, the method described therein is not robust against interference.

SUMMARY

It is therefore an object of the present disclosure to provide a method for radio communication from utility meters to a data receiver, wherein the radio communication is more robust against interference. Furthermore, it is an object of the present disclosure to provide a data receiver and an ARS configured to carry out such a method, and a utility meter that is able to communicate more energy-efficiently with such a data receiver within such an ARS.

According to a first aspect of the present disclosure, a method is provided for radio communication of a plurality of utility meters being installed at distributed installation locations with a data receiver, wherein the method comprises:
  receiving, at the data receiver, data from any of the utility meters, wherein the data is modulated on a received signal, wherein the received signal has a time-varying phase offset; and
  compensating for the time-varying phase offset of the received signal by using decision-directed phase tracking;
characterized in that the method further comprises:
  coherently demodulating the compensated received signal to extract the data;

modulating the extracted data to reconstruct a replica of the received signal;

estimating a phase offset prediction error based on a comparison between the compensated received signal and the replica of the received signal;

estimating a phase offset prediction error covariance based on how much the amplitude of the compensated received signal diverges from an amplitude reference value and/or the phase offset prediction error diverges from an error reference value;

providing a Kalman filter with both the estimated phase offset prediction error and the estimated phase offset prediction error covariance as inputs for the Kalman filter; and using an output of the Kalman filter as a prediction of the time-varying phase offset in a feedback loop to compensate for the time-varying phase offset of the received signal before the compensated received signal is coherently demodulated to extract the data.

This makes the radio communication robust against intermittent interference experienced during radio burst reception, because the decision-directed phase tracking becomes more reliable when the phase offset prediction error estimation is used in conjunction with the estimated phase offset prediction error covariance. The estimation of the estimated phase offset prediction error covariance allows the Kalman-filter-based decision-directed phase tracking to suppress interference. This is, because a corrupted phase offset prediction error estimate may essentially be ignored during interfered sections of the burst. During such interfered sections, the Kalman filter may make predictions based on prior observations made in periods with a low covariance, i.e. without interference. Assuming a time-varying phase offset model of the Kalman filter has not changed significantly during the interfered section, coherent demodulation can be resumed once the interference is gone. This means that coherent demodulation can be resumed once the interference is gone, whereby the full robustness provided by upper protocol layers can be utilized. In addition to its inherent robustness towards interference, the method according to the present disclosure also enables phase tracking at a very low signal-to-noise ratio (SNR).

The received signal may be denoted as $r(t)=As(t)e^{j\theta(t)}$, wherein $s(t)$ is the information carrying signal, $A$ is the received signal amplitude, and $\theta(t)$ is the time-varying phase offset that may impair the reception. Given a phase offset prediction $y(t)=\hat{\theta}_N(t)$, wherein $$y_k = \hat{\theta}_N(t = t_0 + k\Delta T) = \sum_{n=0}^{N} \frac{\theta^{(n)}(t_0)}{n!}(t-t_0)^n$$

is an $N^{th}$ order Taylor approximation of the time-varying phase offset used as the Kalman filter output with $\theta^{(n)}(t_0)$ being the $n^{th}$ derivative of the time-varying phase offset $\theta(t)$ at time $t_0$, the compensated received signal $r_c(t)$, i.e. after phase rotation, is given by $$r_c(t) = As(t)e^{j\theta(t) - j\hat{\theta}(t)} = As(t)e^{j\epsilon(t)},$$

wherein $\epsilon(t)$ denotes the phase offset prediction error that may be caused by changes in the phase trajectory, interference and/or noise. Using the decision-directed feedback, a replica $\hat{s}(t)$ of the information carrying signal $s(t)$ is produced. Since $s^*(t)\hat{s}(t)=1$, the error term can be extracted by multiplying the complex conjugate of the compensated received signal with the replica. Thereby, the estimated phase offset prediction error $e(t)$ may be generated:

$$e(t) = r_c^*(t)s(t) = Ae^{j\epsilon(t)}.$$

If $e_k = e(k\Delta T)$ denotes the phase offset prediction error at the $k^{th}$ time-step $\Delta T$, then the measured (observed) input $z_k$ for the Kalman filter is given by $$z_k = y_k + \arg(e_k),$$

which is the current Kalman filter output (prediction) $y_k$ plus the argument of the estimated phase offset prediction error $e_k$. It should be noted that the (observed) Kalman filter input $z_k$ is assumed to be normally distributed with a covariance $R_k$ being another input to the Kalman filter.

Optionally, estimating the phase offset prediction error covariance may comprise determining an amplitude divergence of the compensated received signal relative to the amplitude reference value over a plurality of samples and mapping the amplitude divergence before the mapped amplitude divergence is used as an input for the Kalman filter. The reason for this is that interference may cause amplitude changes in the received signal. For example, the amplitude of the compensated received signal in the $k^{th}$ sample may be denoted as $r_{c,k}$ and a second-order amplitude test-statistic over the latest $M$ samples may be defined as $$t_A[k] = \sum_{m=0}^{M-1} |r_{c,k-m}|^2.$$

The amplitude reference value for the above amplitude test-statistic in absence of interference may be denoted as $$\langle t_A[k] \rangle = (A^2 + \sigma^2)M,$$

wherein $A$ is an amplitude of the received signal and $\sigma$ is a received noise level, wherein both $A$ and $\sigma$ are determined based on known data-aided determination methods. The amplitude divergence may then be quantified by an amplitude indicator $I_A[k]$ with $$I_A[k] = \frac{t_A[k]}{(A^2 + \sigma^2)M},$$

which increases whenever the amplitude changes, for instance due to interference. Under normal conditions, the amplitude indicator $I_A[k]$ is expected to be equal to 1. Any significantly larger value indicates the presence of interference. The amplitude indicator $I_A[k]$ is mapped to a Kalman filter covariance input $R_k$ of the observation $z_x$ using the mapping function $\varphi_A: \mathbb{R} \to \mathbb{R}^+$. The mapping may be any weakly or strictly monotonically increasing discrete or continuous function with the specified range and domain. It may be exact if the type of interference is known, but this is no strict requirement. One example mapping may be the parametric rectified linear unit (ReLU) function $$\varphi_A = ReLU(a(I_A - b)) = \max(0, a(I_A - b))$$

where a is a scale value and b≥1 is a bias. Example values are a=1/10, b=1. $\varphi_A$ may then be used as a covariance $R_k$ input for the Kalman filter, i.e. $R_k=\varphi_A$.

Optionally, estimating the phase offset prediction error covariance may comprise determining a phase offset prediction error divergence relative to the error reference value over a plurality of samples and mapping the phase offset prediction error divergence before the mapped phase offset prediction error divergence is used as an input for the Kalman filter. The reason for this is that interference may introduce noise to the phase offset prediction error. For example, the phase offset prediction error in the $k^{th}$ sample may be denoted as ex and a second-order phase offset prediction error test-statistic over the latest M samples may be defined as $$t_\theta[k] = \left|\sum_{m=0}^{M-1} e_{k-m}\right|^2$$

The error reference value for the above phase offset prediction error test-statistic in absence of interference may be denoted as $$\langle t_\theta[k]\rangle = (A^2 M + \sigma^2)M.$$

The phase offset prediction error divergence may then be quantified by a phase offset prediction error indicator $I_\theta[k]$ with $$I_\theta[k] = \frac{(A^2 M + \sigma^2)M}{t_\theta[k]},$$

which increases whenever noise is added to the phase offset prediction error, for instance due to interference. Under normal conditions, the phase offset prediction error indicator $I_\theta[k]$ is expected to be equal to 1. Any significantly larger value indicates the presence of interference. The phase offset prediction error indicator $I_\theta[k]$ is mapped to a Kalman filter covariance input $R_k$ of the observation $z_k$ using the mapping function $\varphi_\theta: \mathbb{R} \to \mathbb{R}^+$. The mapping may be any weakly or strictly monotonically increasing discrete or continuous function with the specified range and domain. It may be exact if the type of interference is known, but this is no strict requirement. One example mapping may be the parametric rectified linear unit (ReLU) function $$\varphi_\theta = ReLU(a(I_\theta - b)) = \max(0, a(I_\theta - b))$$

where a is a scale value and b≥1 is a bias. Example values are a=1/10, b=1. $\varphi_\theta$ may then be used as covariance input $R_k$ for the Kalman filter.

Optionally, a phase offset prediction error covariance based on a data-aided determination of a power of the received signal and/or of a noise power and/or a signal-to-noise ratio, SNR, may be used as an initial input for the Kalman filter. Existing knowledge about the noise level, for instance, can be used to improve the start of the phase tracking.

Optionally, estimating the phase offset prediction error may comprise averaging the phase offset prediction error over a plurality of samples before the argument of the averaged phase offset prediction error used as an input for the Kalman filter. Alternatively, or in addition, estimating the phase offset prediction error may comprise summing the phase offset prediction error over a plurality of samples before the summed phase offset prediction error is used as a (observed) input for the Kalman filter. This is particularly useful in environments with a low signal-to-noise ratio, SNR, e.g. below 5 decibels. Under such low SNR conditions, the noise on the received signal may introduce significant phase noise which may easily exceed the currently estimated phase offset prediction error. If sufficiently large, the phase noise will no longer be normally distributed as expected by the Kalman filter, and the observations may become ambiguous, i.e. the phase error is modelled by $\arg(e_k)+2\pi i$ with $i \in \mathbb{Z}$ being unknown. If the phase offset prediction error is summed over the latest M samples, the SNR of the estimated phase offset prediction error $e_k$ may be increased by a factor of M, which means that ambiguities can be avoided at SNR levels down to approximately 5-10 $\log_{10}M$ decibels. For example, the Kalman filter may take as input an observation vector $z_k$ at the $k^{th}$ step of DT in time after a start at time $t_0$ in the form of $$z_k = y_k + \arg e'_k, \text{ wherein}$$

$$e'_k = \sum_{m=0}^{M-1} e_{k-m}$$

is a sum of the phase offset prediction error over the latest M samples. The SNR of the estimated phase offset prediction error $e_k'$ is increased compared to $e_k$, because noise-induced phase shifts add non-coherently in the sum, whereas systematic phase shifts add up coherently in the summed estimated phase offset prediction error $e_k'$.

Optionally, estimating the phase offset prediction error covariance may comprise determining a maximum divergence among the group comprising:
a mapped amplitude divergence,
a mapped phase offset prediction error divergence, and
a pre-determined minimum variance
before the maximum divergence is used as an input for the Kalman filter. This means that the largest covariance is selected to form the observation covariance $R_k$ as input for the Kalman filter. That is, $$R_k = \max(\varphi_A[k], \varphi_\theta[k], \sigma_{min}^2),$$

where $\sigma_{min}^2$ is a pre-determined minimum variance value preventing an observation covariance $R_k$ of zero, which could be degenerate for the Kalman filter.

Optionally, the compensated received signal may be delayed before it is compared with the replica of the received signal in order to account for the time needed for demodulating and modulating. This facilitates the decision-directed phase tracking for generating the observation vector $z_k$ as input for the Kalman filter.

According to another aspect of the present disclosure, a data receiver of an automatic reading system, ARS, is provided, wherein the data receiver is configured to carry out the method steps described above.

According to another aspect of the present disclosure, a utility meter is provided that is configured to be installed at an installation location and to wirelessly send data to such a data receiver, wherein the utility meter comprises a radio transmitter having a crystal oscillator, wherein the crystal oscillator has a pre-defined warm-up period during which a resonance frequency of the crystal oscillator has not yet stabilized, wherein the utility meter is configured to start sending data to the data receiver during the warm-up period. This is particularly beneficial to save energy of the preferably battery-powered utility meter, because it does not have to wait for the warm-up period to lapse before it can start transmitting. Sending the data to a data receiver that is able to track the phase even in congested radio environments with interference and/or low SNR levels allows the utility meter to start transmitting earlier for saving energy.

Optionally, the utility meter may be a consumption meter for measuring and automatically sending values of consumption of water, thermal energy, electricity, and/or gas at the installation location. Alternatively, or in addition, the utility meter may be an alarm sensor, an acoustic noise detector, a chemical sensor, a turbidity sensor, a remotely controlled valve or another kind of monitoring device that is supposed to send regularly information to a head-end system, HES.

According to another aspect of the present disclosure, an automatic reading system, ARS, is provided comprising at least one such data receiver and a plurality of such utility meters.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
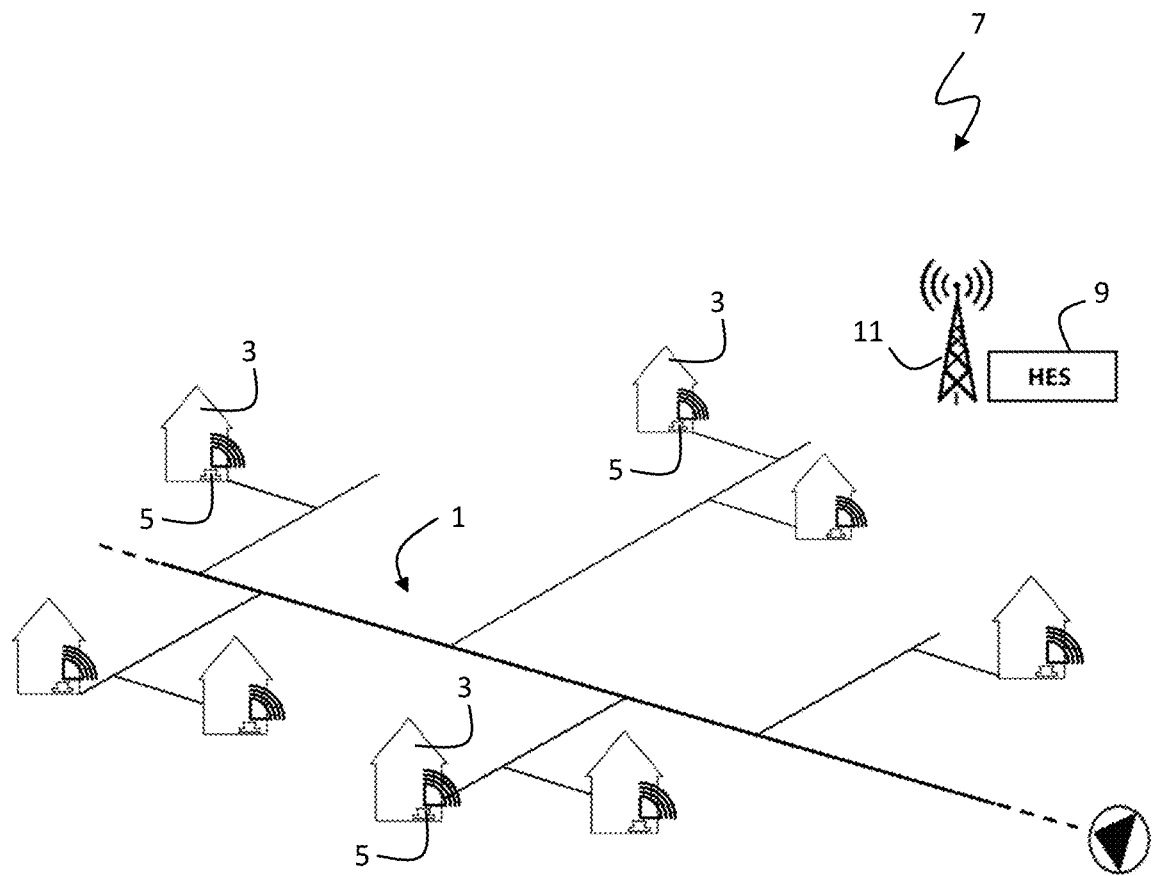
FIG. 1 is a schematic drawing of a utility network with an example of an ARS according to the present disclosure.

Referring to the drawings, FIG. 1 shows schematically a utility supply network 1 for supplying a plurality of households 3 with a commodity such as drinking water, gas, electricity and/or thermal energy. At each of the supplied households 3, a utility meter 5 is installed at an installation location of the supply network 1 primarily for the purpose of registering a consumption for billing. An automatic reading system (ARS) 7 is used to automatically collect the data wirelessly from the utility meters 5. The ARS 7 comprises a head-end system (HES) 9, a data receiver 11 of a Low Power Wide Area Network (LPWAN), and the plurality of utility meters 5 installed in the supply network 1. One or more of the utility meters 5 may alternatively be an alarm sensor, an acoustic noise detector, a chemical sensor, a turbidity sensor, a remotely controlled valve or another kind of monitoring device that is supposed to send regularly information to the HES 9. The HES 9 receives and processes information from and/or controls the behavior of the plurality of utility meters 5. The narrow-band radio communication between the utility meters 5 and the data receiver 11 is bi-directional, but the present disclosure focusses on the uplink radio communication from the utility meters 5 to the data receiver 11.

Figure 2:
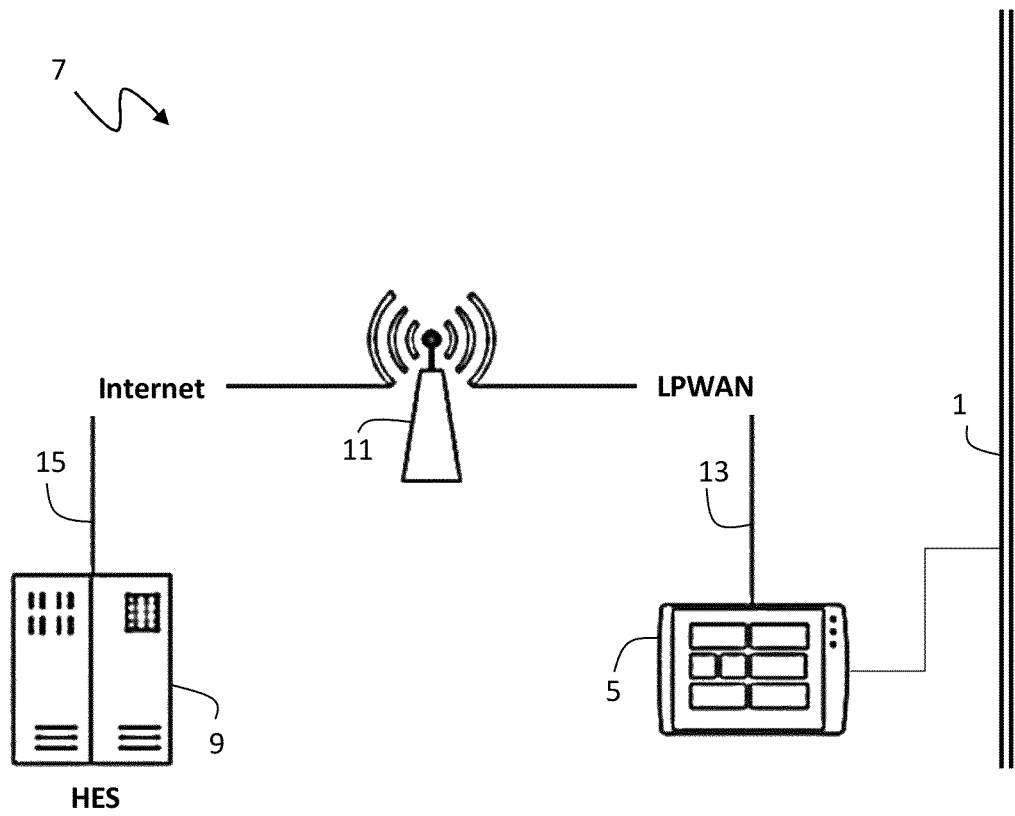
FIG. 2 is a schematic drawing of the communication within an ARS of FIG. 1.

FIG. 2 shows the ARS 7 in more detail for one of the utility meters 5 as an example. The utility meter 5 measures a quantity, for example water flow through a pipe connected to a drinking water supply network 1. The utility meter 5 may be a battery-powered ultrasonic flow meter. The utility meter 5 communicates wirelessly with the data receiver 11 in form of a base station via a LPWAN 13. The data receiver 11 is connected to the HES 9 via a cable internet connection 15. The utility meter 5 sends via the LPWAN data which is phase modulated on a signal or waveform, for example using Gaussian Minimum Shift Keying (GMSK) or another well-known suitable modulation. For coherent detection of the signal at the data receiver 11, needs to know the absolute phase of the received signal to an accuracy of +/−20 degrees (depending on the modulation used) with respect to an internal reference phase of the data receiver 11.

For many reasons the absolute phase may drift and vary over time. Therefore, it is known, for example from U.S. Pat. No. 6,456,671 B1 to compensate for a time-varying phase offset of the received signal by using decision-directed phase tracking. However, such known phase tracking methods are not robust enough against interference in congested radio environments of an ARS and cannot operate at low SNR levels.

Figure 3:
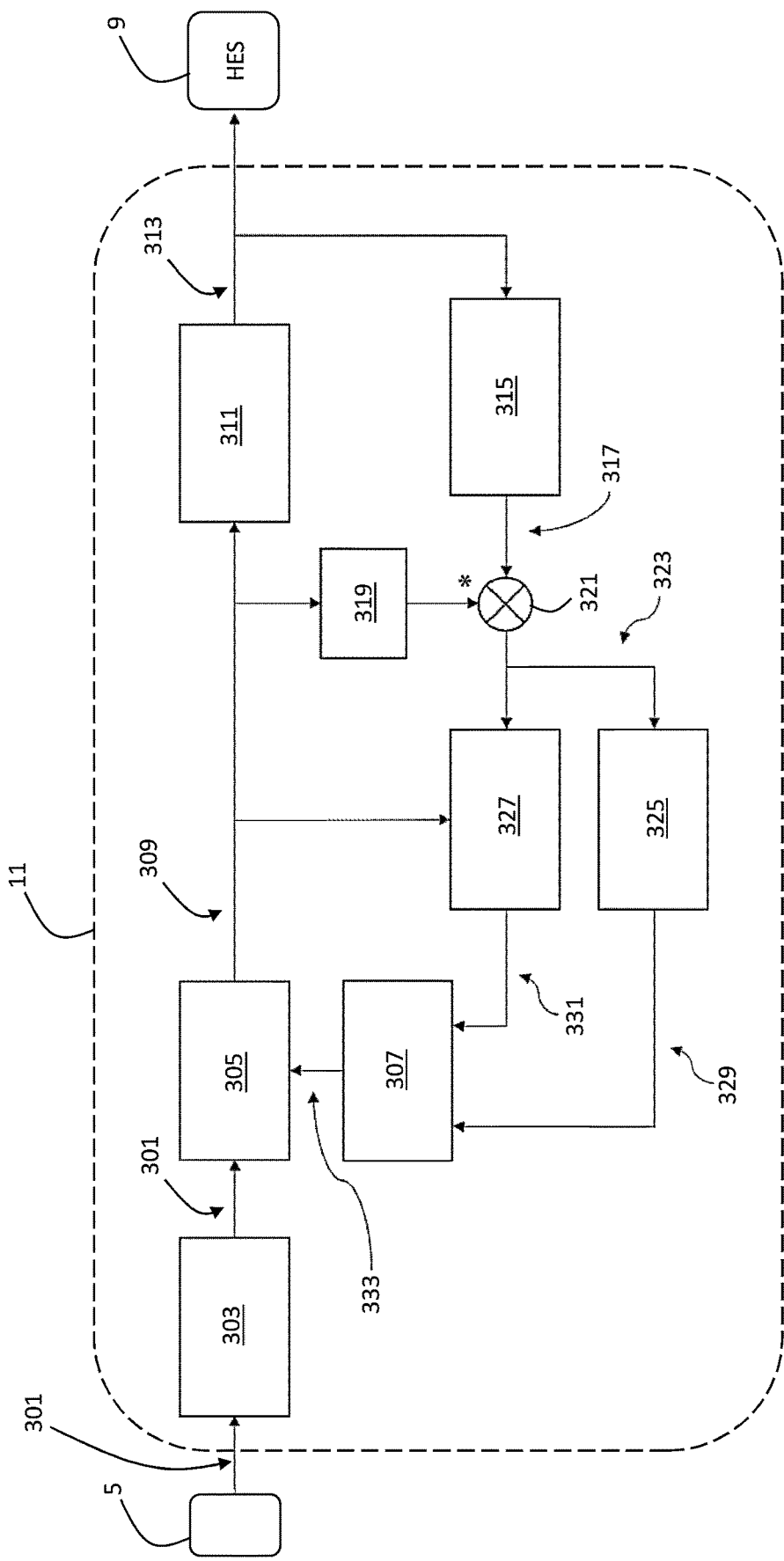
FIG. 3 is a schematic representation of an example of a method of radio communication according to the present disclosure.

FIG. 3 shows schematically how the data receiver 11 is programmed with an improved decision-directed phase tracking that is robust enough against interference in congested radio environments of an ARS 7. A phase-modulated signal 301 is received by the data receiver 11 from the utility meter 5. After it passes a channel filter 303, the signal phase is rotated in a phase rotator 305 in order to compensate for a time-varying phase offset of the received signal 301. As explained later, the phase rotator 305 takes as input an output from a Kalman filter 307 setting the amount of phase rotation at the phase rotator 305. The output of the phase rotator 305 is a compensated received signal 309. The compensated received signal 309 is then demodulated in a demodulator 311 to extract data 313. The extracted data 313 is transferred to the HES 7, but also used for the decision-directed phase tracking. The extracted data 313 is modulated at a modulator 315 to reconstruct a replica 317 of the received signal 301. The replica 317 may be considered to be a phase error free version of the received signal 301. The compensated received signal 309 is delayed by delay 319 in order to account for the time needed for demodulating and modulating. A complex conjugate of the delayed compensated received signal 309 is multiplied by multiplicator 321 with the replica 317 of the received signal 301. Thereby, the compensated received signal 309 and the replica 317 of the received signal is compared such that the multiplicator 321 outputs a calculated phase offset prediction error 323.

The calculated phase offset prediction error 323 is fed in parallel into a phase offset prediction error estimator 325 and a phase offset prediction error covariance estimator 327. In the phase offset prediction error estimator 325, as described in more detail with reference to FIG. 5a, the calculated phase offset prediction error 323 is summed over the latest M samples to yield the argument of an estimated phase offset prediction error 329 as an input for the Kalman filter 307. The phase offset prediction error covariance estimator 327 takes two inputs: the compensated received signal 309 and the calculated phase offset prediction error 323. As described in more detail with reference to FIG. 4, a phase offset prediction error covariance estimate 331 is generated based on how much the amplitude of the compensated received signal 309 diverges from an amplitude reference value and/or based on how much the phase offset prediction error 323 diverges from an error reference value. Both, the estimated phase offset prediction error 329 and the estimated phase offset prediction error covariance 313 are fed into the Kalman filter 307 as inputs. The output of the Kalman filter 307 is a phase offset prediction 333 which closes the feedback loop as it is fed into the phase rotator 305 for compensating the time-varying phase offset of the received signal 301 before the compensated received signal 309 is again coherently demodulated to extract the data 313.

Figure 4:
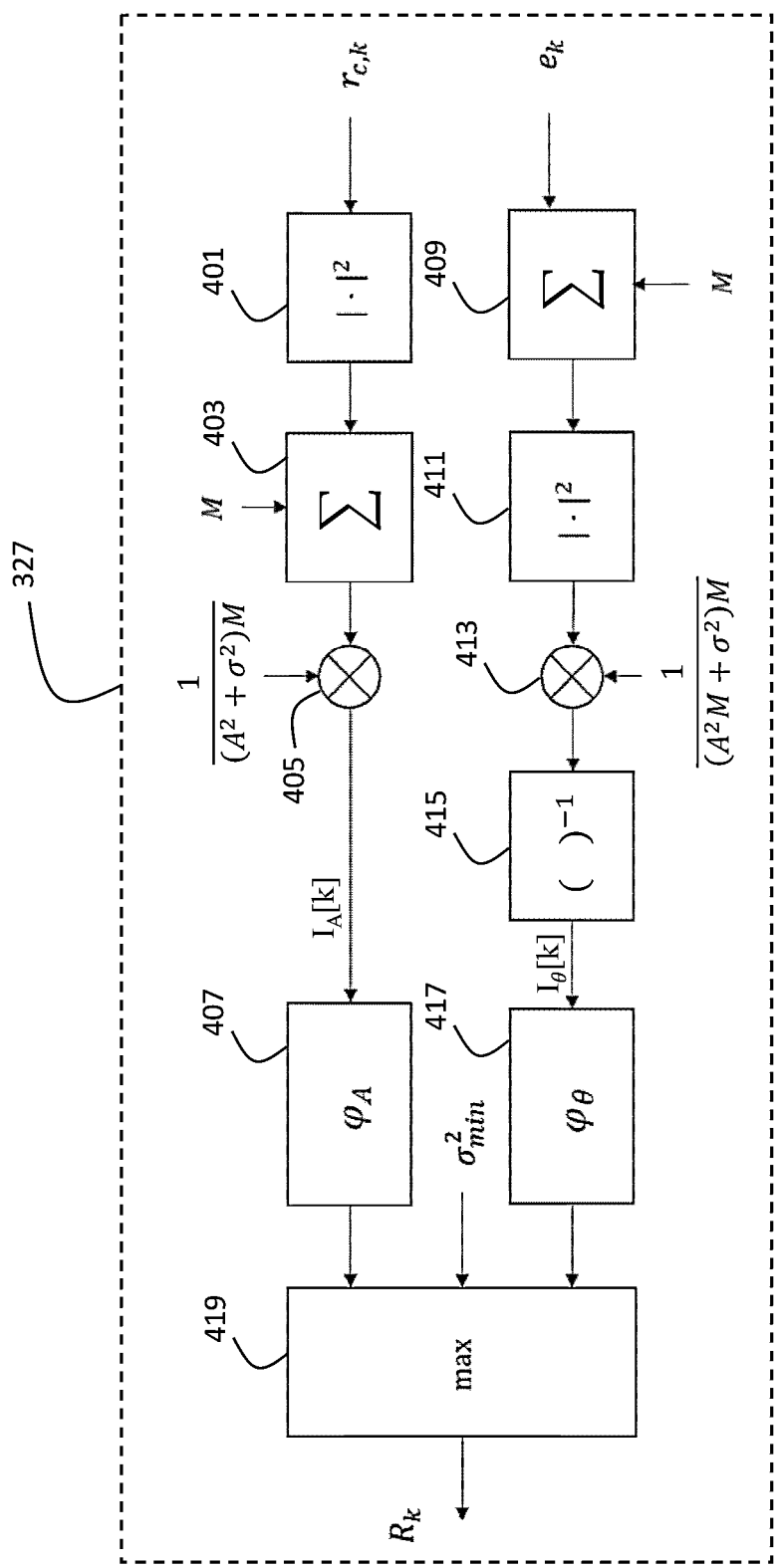
FIG. 4 is a schematic representation of an example of how the phase offset prediction error covariance is estimated according to the present disclosure.

FIG. 4 shows the phase offset prediction error covariance estimator 327 of FIG. 3 in more detail. The first input is the amplitude of the compensated received signal 309. The reason for this is that interference may cause amplitude changes in the received signal. The amplitude of the compensated received signal 309 in the $k^{th}$ sample may be denoted as $r_{c,k}$ and a second-order amplitude test-statistic over the latest M samples may be defined as $$t_A[k] = \sum_{m=0}^{M-1} |r_{c,k-m}|^2.$$

So, in step 401, the absolute value of the amplitude $r_{c,k}$ is squared and in step 403 summed up over the latest M samples. In step 405, the amplitude test-statistic is multiplied by the inverse of the amplitude reference value, which, in absence of interference, may be denoted as $$\langle t_A[k] \rangle = (A^2 + \sigma^2)M,$$

wherein A is an amplitude of the received signal and σ is a received noise level, wherein both A and σ are determined based on known data-aided determination methods. The result of the multiplication 405 is an amplitude indicator $I_A[k]$ with $$I_A[k] = \frac{t_A[k]}{(A^2 + \sigma^2)M},$$

which increases whenever the amplitude changes, for instance due to interference. Under normal conditions, the amplitude indicator $I_A[k]$ is expected to be equal to 1. Any significantly larger value indicates the presence of interference. In step 407, the amplitude indicator $I_A[k]$ is mapped to a Kalman filter covariance input $R_k$ of the observation $z_k$ using the mapping function $\varphi_A: \mathbb{R} \to \mathbb{R}^+$. The mapping may be any weakly or strictly monotonically increasing discrete or continuous function with the specified range and domain. It may be exact if the type of interference is known, but this is no strict requirement. One example mapping may be the parametric rectified linear unit (ReLU) function $$\varphi_A = ReLU(a(I_A - b)) = \max(0, a(I_A - b))$$

where a is a scale value and b≥1 is a bias. Example values are a=1/10, b=1. $\varphi_A$ may then be a candidate for being used as covariance $R_k$ input for the Kalman filter 307, i.e. $R_k = \varphi_A$.

Another candidate for being used as covariance $R_k$ input for the Kalman filter 307 is based on the second input of the phase offset prediction error covariance estimator 327, namely the calculated phase offset prediction error 323. The reason for this is that interference may introduce noise to the calculated phase offset prediction error 323. For example, the calculated phase offset prediction error 323 in the $k^{th}$ sample may be denoted as $e_k$ and a second-order phase offset prediction error test-statistic over the latest M samples may be defined as $$t_\theta[k] = \left| \sum_{m=0}^{M-1} e_{k-m} \right|^2.$$

So, in step 409, the calculated phase offset prediction error 323 is summed up over the latest M samples. In step 411, the absolute value of the sum is squared. In step 413, phase offset prediction error test-statistic is multiplied by the inverse of the error reference value for the above phase offset prediction error, which may be, in absence of interference, denoted as $$\langle t_\theta[k] \rangle = (A^2 M + \sigma^2) M.$$

The result of the multiplication 413 is then inversed in step 415 to get a phase offset prediction error indicator $I_\theta[k]$ $$I_\theta[k] = \frac{(A^2 M + \sigma^2) M}{t_\theta[k]},$$

Which increases whenever noise is added to the phase offset prediction error, for instance due to interference. Under normal conditions, the phase offset prediction error indicator $I_\theta[k]$ is expected to be equal to 1. Any significantly larger value indicates the presence of interference. The phase offset prediction error indicator $I_\theta[k]$ is mapped in step 417 to a Kalman filter covariance input $R_k$ of the observation $z_k$ using the mapping function $\varphi_\theta: \mathbb{R} \to \mathbb{R}^+$. The mapping may be any weakly or strictly monotonically increasing discrete or continuous function with the specified range and domain. It may be exact if the type of interference is known, but this is no strict requirement. One example mapping may be the parametric rectified linear unit (ReLU) function $$\varphi_\theta = ReLU(a(I_\theta - b)) = \max(0, a(I_\theta - b))$$

where a is a scale value and $b \geq 1$ is a bias. Example values are $a=1/10$, $b=1$. $\varphi_\theta$ may then be used as a candidate for the covariance input $R_k$ for the Kalman filter.

In step 419, a maximum divergence among the mapped amplitude divergence $\varphi_A$, the mapped phase offset prediction error divergence $\varphi_\theta$, and a pre-determined minimum variance $\sigma_{min}^2$ is determined before the maximum divergence is used as an input for the Kalman filter 307. This means that the largest covariance is selected to form the observation covariance $R^k$ as input for the Kalman filter 307. That is, $$R_k = \max(\varphi_A[k], \varphi_\theta[k], \sigma_{min}^2),$$

where $\sigma_{min}^2$ is a pre-determined minimum variance value preventing an observation covariance $R_k$ of zero, which could be degenerate for the Kalman filter 307.

Figure 5A:
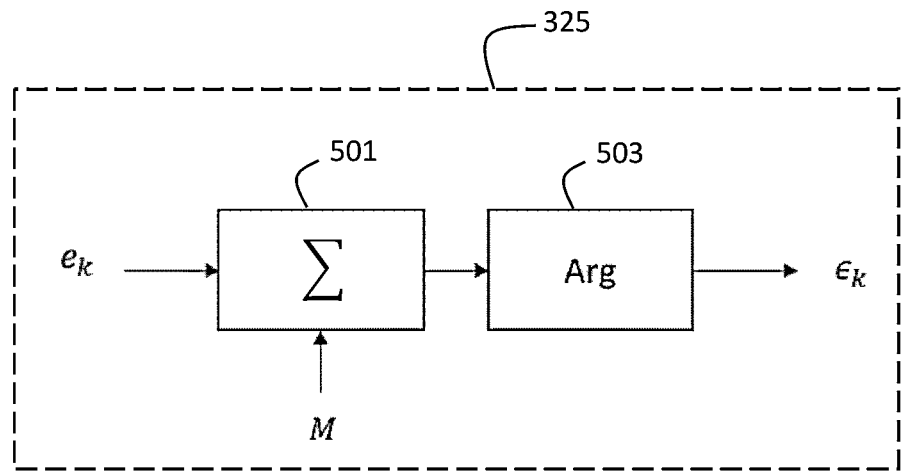
FIG. 5a is a schematic representation of an example of how the phase offset prediction error is summed according to the present disclosure.

FIG. 5a shows in more detail the phase offset prediction error estimator 325 shown in FIG. 3. Rather than using the calculated phase offset prediction error 323 as input for the Kalman filter 307, the calculated phase offset prediction error 323 is summed over the latest M samples in step 501. Then, the argument of the sum is extracted in step 503 to be used as input for the Kalman filter 307. Thereby, the calculated phase offset prediction error 323 is much less sensitive to noise, which is in particular beneficial in low SNR environments.

Figure 5B:
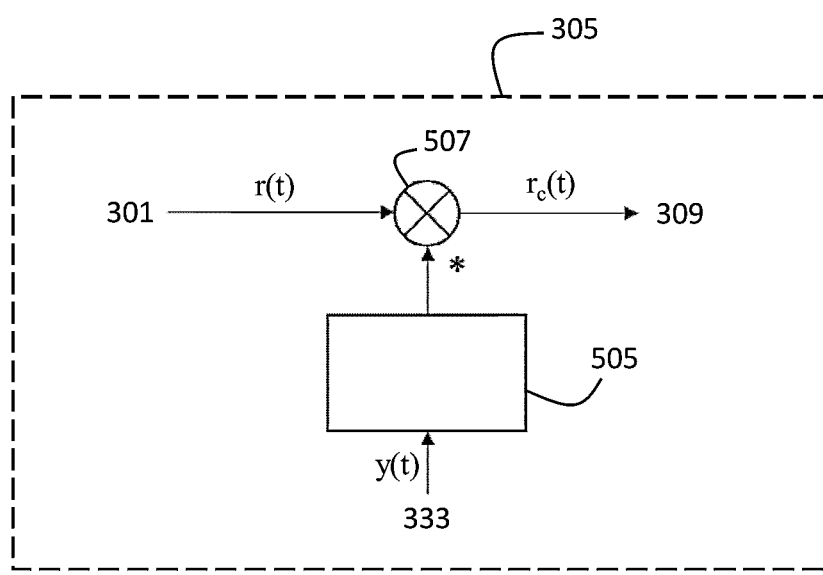
FIG. 5b is a schematic representation of an example of how the phase offset of the received signal is compensated according to the present disclosure.

FIG. 5b shows in more detail the phase rotator 305 shown in FIG. 3. The output 333 of the Kalman filter 307 is a phase offset prediction $y(t)=\hat{\theta}_N(t)$ and converted in step 505 to a complex representation to be complex conjugated and then multiplied in step 507 with the received signal 301 having a time-varying phase offset. The received signal 301 may be denoted as $r(t)=As(t)e^{j\theta(t)}$, wherein s(t) is the information carrying signal, A is the received signal amplitude, and $\theta(t)$ is the time-varying phase offset that may impair the reception. Given a phase offset prediction $y(t)=\hat{\theta}_N(t)$, i.e. the Kalman filter output, the compensated received signal $r_c(t)$, i.e. after phase rotation, is given by $$r_c(t) = As(t)e^{j\theta(t)-j\hat{\theta}(t)} = As(t)e^{j\epsilon(t)},$$

wherein $\epsilon(t)$ denotes the phase offset prediction error that may be caused by changes in the phase trajectory, interference and/or noise.

Figure 6:
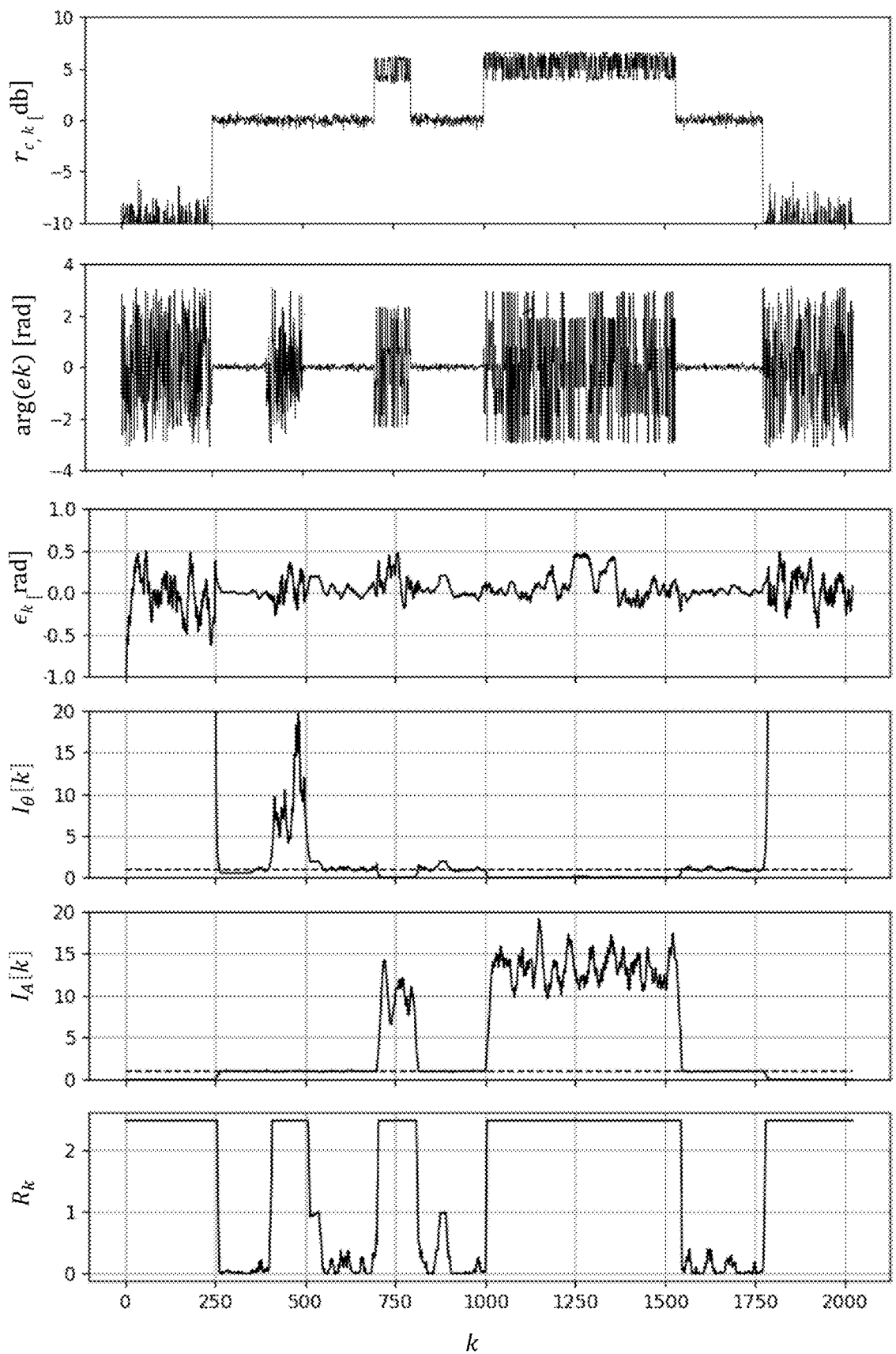
FIG. 6 is a view showing diagrams of an amplitude, a phase noise, a phase offset prediction error, a phase offset prediction error indicator, an amplitude indicator and an estimated phase offset prediction error covariance each as a function of the time step k for an example of a received signal with interference according to the present disclosure.

FIG. 6 shows in the top diagram an amplitude $r_{c,k}$ in dB of the compensated received signal 309 over time in terms of time-steps k. The second diagram from top shows the corresponding argument of the calculated phase offset prediction error 323 in radians. The bottom diagram shows the covariance input $R_k$ for the Kalman filter 307. The top diagram shows an information carrying signal in the range $250 \leq k \leq 1750$. However, there are three types of interferences present in the shown example: pure phase noise in the range $350 \leq k \leq 500$, an in-band carrier interference in the range $700 \leq k \leq 800$, and a self-interference $1000 \leq k \leq 1550$. During the interferences, the calculated phase offset prediction error 323 fluctuates much larger, because the interference adds noise to the phase offset prediction error 323. As can be seen in the range $350 \leq k \leq 500$, noise in the phase offset prediction error 323 may also be present if no amplitude divergence is detected. As can be seen in the bottom diagram, all those k-ranges with a high fluctuation of the calculated phase offset prediction error 323 have a high value of covariance input $R_k$ for the Kalman filter 307. The Kalman filter 307 will thus essentially disregard the samples in these ranges for updating its prediction model. Thereby, reliable decision-directed phase tracking can be resumed immediately after the interference is gone to reduce the risk of losing data packets.

The third diagram from top of FIG. 6 shows the argument $\epsilon_k$ in radians of the summed estimated phase offset prediction error $e_k'$ over the latest M samples. As can be seen, it is much less sensitive to noise than the calculated phase offset prediction error 323. Therefore, it is particularly beneficial to use it as observation input for the Kalman filter 307 in low SNR environments. The fourth diagram from top shows the phase offset prediction error indicator $I_\theta[k]$ which clearly indicates the noise interference in the range $350 \leq k \leq 500$. The fifth diagram from top shows the amplitude indicator $I_0[k]$ which clearly indicates the amplitude interferences in the ranges $700 \leq k \leq 800$ and $1000 \leq k \leq 1550$. The Kalman filter 307 will thus essentially disregard the samples in those samples with a high covariance input $R_k$ (bottom diagram of FIG. 6) when updating its prediction model. Thereby, reliable decision-directed phase tracking can be resumed immediately after the interference is gone to reduce the risk of losing data packets.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one aspect or embodiment may be used alone, or in combination with other features described, and may also be used in combination with one or more features of any other of the aspects or embodiments, or any combination of any other of the aspects or embodiments. While at least one exemplary aspect or embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary aspects or embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

List of Reference Numerals 1 utility supply network
3 household
5 utility meter
7 ARS
9 HES
11 data receiver
13 LPWAN
15 internet connection
301 received signal
303 channel filter
305 phase rotator
307 Kalman filter
309 compensated received signal
311 demodulator
313 data
315 modulator
317 replica of the received signal
319 delay
321 multiplicator
323 calculated phase offset prediction error
325 phase offset prediction error estimator
327 phase offset prediction error covariance estimator
329 estimated phase offset prediction error
331 estimated phase offset prediction error covariance
333 phase offset prediction
401 squaring of absolute value
403 summing
405 multiplying
407 mapping
409 summing
411 squaring of absolute value
413 multiplying
415 inverting
417 mapping
419 determining maximum
501 summing
503 determining argument
505 converting to complex representation
507 multiplying

What is claimed is:

1. A method for radio communication of a plurality of utility meters that are installed at distributed installation locations with a data receiver, the method comprising the steps of:
receiving, at the data receiver, data from the plurality of utility meters, wherein the data is modulated on a received signal, wherein the received signal has a time-varying phase offset;
compensating for the time-varying phase offset of the received signal by using decision-directed phase tracking to provide a compensated received signal;
coherently demodulating the compensated received signal to extract the data;
modulating the extracted data to reconstruct a replica of the received signal;
estimating a phase offset prediction error based on a comparison between the compensated received signal and the replica of the received signal;
estimating a phase offset prediction error covariance based on how much an amplitude of the compensated received signal diverges from an amplitude reference value and/or based on how much the phase offset prediction error diverges from an error reference value;
providing a Kalman filter with both the estimated phase offset prediction error and the estimated phase offset prediction error covariance as inputs for the Kalman filter; and
using an output of the Kalman filter as a prediction of the time-varying phase offset in a feedback loop to compensate for the time-varying phase offset of the received signal before the compensated received signal is coherently demodulated to extract the data.

2. The method of claim 1, wherein said estimating the phase offset prediction error covariance comprises determining an amplitude divergence of the compensated received signal relative to the amplitude reference value over a plurality of samples and mapping the amplitude divergence before the mapped amplitude divergence is used as the phase offset prediction error covariance as an input for the Kalman filter.

3. The method of claim 1, wherein said estimating the phase offset prediction error covariance comprises determining a phase offset prediction error divergence relative to the error reference value over a plurality of samples and mapping the phase offset prediction error divergence before the mapped phase offset prediction error divergence is used as the phase offset prediction error covariance as an input for the Kalman filter.

4. The method of claim 1, wherein the phase offset prediction error covariance is based on a data-aided determination of a power of the received signal and/or of a noise power and/or a signal-to-noise ratio as an initial input for the Kalman filter.

5. The method of claim 1, wherein said estimating the phase offset prediction error comprises averaging the phase offset prediction error over a plurality of samples and an argument of the averaged phase offset prediction error is used as the estimated phase offset prediction error as an input for the Kalman filter.

6. The method of claim 1, wherein said estimating the phase offset prediction error comprises summing the phase offset prediction error over a plurality of samples and an argument of the summed phase offset prediction error is used as the estimated phase offset prediction error as an input for the Kalman filter.

7. The method of claim 1, wherein said estimating the phase offset prediction error covariance comprises determining a maximum divergence among a group comprising:
- a mapped amplitude divergence;
- a mapped phase offset prediction error divergence; and
- a pre-determined minimum variance, and wherein the maximum divergence is used as the phase offset prediction error covariance as an input for the Kalman filter.

8. The method of claim 1, wherein the compensated received signal is delayed before the compensated received signal is compared with the replica of the received signal in order to account for a time needed for demodulating and modulating.

9. A data receiver of an automatic reading system for radio communication with a plurality of utility meters that are installed at distributed installation locations, wherein the data receiver is configured to:
- receive, data from the plurality of utility meters, wherein the data is modulated on a received signal, wherein the received signal has a time-varying phase offset;
- compensate for the time-varying phase offset of the received signal by using decision-directed phase tracking to provide a compensated received signal;
- coherently demodulate the compensated received signal to extract the data;
- modulate the extracted data to reconstruct a replica of the received signal;
- estimate a phase offset prediction error based on a comparison between the compensated received signal and the replica of the received signal;
- estimate a phase offset prediction error covariance based on how much an amplitude of the compensated received signal diverges from an amplitude reference value and/or based on how much the phase offset prediction error diverges from an error reference value;
- provide both the estimated phase offset prediction error and the estimated phase offset prediction error covariance as inputs for a Kalman filter; and
- use an output of the Kalman filter as a prediction of the time-varying phase offset in a feedback loop to compensate for the time-varying phase offset of the received signal before the compensated received signal is coherently demodulated to extract the data.

10. The data receiver of claim 9, wherein a utility meter is configured to be installed at an installation location and to wirelessly send the data to the data receiver and the utility meter comprises a radio transmitter having a crystal oscillator, wherein the crystal oscillator has a pre-defined warm-up period during which a resonance frequency of the crystal oscillator has not yet stabilized, wherein the utility meter is configured to start sending the data to the data receiver during the warm-up period.

11. The data receiver of claim 10, wherein the utility meter is battery-powered.

12. The data receiver of claim 10, wherein the utility meter is a consumption meter for measuring and automatically sending values of consumption of water, thermal energy, electricity, and/or gas at the installation location.

13. A utility meter configured to be installed at an installation location and to wirelessly communicate to a data receiver of claim 9, wherein the utility meter comprises a radio transmitter having a crystal oscillator, wherein the crystal oscillator has a pre-defined warm-up period during which a resonance frequency of the crystal oscillator has not yet stabilized, wherein the utility meter is configured to start sending the data to the data receiver during the warm-up period.

14. The utility meter of claim 13, wherein the utility meter is battery-powered.

15. The utility meter of claim 13, wherein the utility meter is a consumption meter for measuring and automatically sending values of consumption of water, thermal energy, electricity, and/or gas at the installation location.

* * * * *